US006784805B2

(12) United States Patent
Harris et al.

(10) Patent No.: US 6,784,805 B2
(45) Date of Patent: Aug. 31, 2004

(54) STATE-BASED REMOTE CONTROL SYSTEM

(75) Inventors: Glen McLean Harris, Mississauga (CA); Justin M. Henry, Mississauga (CA)

(73) Assignee: Intrigue Technologies Inc., Mississauga (CA)

( * ) Notice: Subject to any disclaimer, the term of this patent is extended or adjusted under 35 U.S.C. 154(b) by 501 days.

(21) Appl. No.: 09/804,718

(22) Filed: Mar. 12, 2001

(65) Prior Publication Data

US 2001/0045819 A1 Nov. 29, 2001

Related U.S. Application Data

(60) Provisional application No. 60/253,727, filed on Nov. 29, 2000, and provisional application No. 60/189,487, filed on Mar. 15, 2000.

(51) Int. Cl.[7] .................... G08C 19/00; G05B 23/02
(52) U.S. Cl. ..................... 340/825.69; 340/825.72; 340/3.2
(58) Field of Search ............... 340/825.69, 825.72, 340/825.49, 310.06, 825.37, 3.2, 3.1; 700/83; 398/1, 106, 115, 126, 127; 219/497, 413, 483

(56) References Cited

U.S. PATENT DOCUMENTS

| | | | | |
|---|---|---|---|---|
| 3,990,012 A | | 11/1976 | Karnes ..................... 325/308 |
| 4,174,517 A | | 11/1979 | Mandel ..................... 340/310 |
| 4,394,691 A | | 7/1983 | Amano et al. ............. 358/194.1 |
| 4,488,179 A | | 12/1984 | Kruger et al. ............. 358/181 |
| 4,566,034 A | | 1/1986 | Harger et al. ............. 358/194.1 |
| 4,626,848 A | | 12/1986 | Ehlers ..................... 340/825.69 |
| 4,837,627 A | | 6/1989 | Mengel ..................... 358/191.1 |
| 4,918,439 A | | 4/1990 | Wozniak et al. ........... 340/825.22 |
| 5,109,222 A | * | 4/1992 | Welty ..................... 340/825.72 |
| 5,161,023 A | | 11/1992 | Keenan ..................... 358/193.1 |
| 5,481,251 A | | 1/1996 | Buys et al. ............. 340/825.22 |
| 5,579,221 A | * | 11/1996 | Mun ..................... 700/83 |
| 5,943,228 A | | 8/1999 | Kim ..................... 363/100 |
| 5,949,351 A | | 9/1999 | Hahm ..................... 340/825.72 |
| 6,538,556 B1 | * | 3/2003 | Kawajiri ..................... 340/3.2 |

FOREIGN PATENT DOCUMENTS

| | | |
|---|---|---|
| EP | 0103438 | 3/1984 |
| EP | 398550 | 11/1990 |
| EP | 1014577 | 6/2000 |
| GB | 2081948 | 2/1982 |
| GB | 2175724 | 12/1986 |

OTHER PUBLICATIONS

Steve Ciarcia, Build a Trainable Infrared Master Controller, Byte, Mar. 1987, pp. 113–123, vol. 12 No. 3.
Radio Shack, Owner's Manual, Universal Remote Control, 1987, pp. 1–29.
Steve Ciarcia, The Best of Ciarcia's Circuit Cellar, 1987, pp. 345–354.

* cited by examiner

*Primary Examiner*—Michael Horabik
*Assistant Examiner*—William Bangachon
(74) *Attorney, Agent, or Firm*—Michael S. Neustel

(57) ABSTRACT

A state-based remote control system for providing efficient and simple operation of a plurality of electronic devices as a coordinated system based upon an overall task. The state-based remote control system includes a housing, a keypad in communication with an electronic system contained within the housing, and a communication device in communication with the electronic system for communicating with external electronic devices. The electronic system monitors the buttons selected by a user to determine the state of all external electronic devices that are to be controlled. When the user selects a task (e.g. watch television), the electronic system automatically determines the actions required to achieve the desired task based upon the current state of the external electronic devices. After the task has been fulfilled, the electronic system updates the data to reflect the modified state of the external electronic devices.

35 Claims, 12 Drawing Sheets

STATE-BASED REMOTE CONTROL SYSTEM

CROSS-REFERENCE TO RELATED U.S. PROVISIONAL PATENT APPLICATIONS

I hereby claim benefit under Title 35, United States Code, Section 119(e) of U.S. provisional patent application Serial No. 60/189,487 filed Mar. 15, 2000, and U.S. provisional patent application Serial No. 60/253,727 filed Nov. 29, 2000. This application is a continuation of the 60/189,487 and 60/253,727 applications. The 60/189,487 and 60/253,727 applications are currently pending. The 60/189,487 and 60/253,727 applications are hereby incorporated by reference into this patent application.

BACKGROUND OF THE INVENTION

1. Field of the Invention

The present invention relates generally to remote control devices and more specifically it relates to a state-based remote control system for providing efficient and simple operation of a plurality of electronic devices as a coordinated system based upon an overall task.

2. Description of the Prior Art

Remote control devices have been in use for years. Remote control devices are utilized to operate various external electronic devices including but not limited to televisions, stereos, receivers, VCRs, DVD players, CD players, amplifiers, equalizers, tape players, cable units, lighting, window shades and other electronic devices. A conventional remote control is typically comprised of a housing structure, a keypad within the housing structure for entering commands by the user, electronic circuitry within the housing structure connected to the keypad, and a transmitter electrically connected to the electronic circuitry for transmitting a control signal to an electronic device to be operated.

The user depresses one or more buttons upon the keypad when a desired operation of a specific electronic device is desired. For example, if the user desires to turn the power off to a VCR, the user will depress the power button upon the remote control which transmits a "power off" control signal that is detected by the VCR resulting in the VCR turning off.

Because of the multiple electronic devices currently available within many homes and businesses today, a relatively new type of remote control is utilized to allow for the control of a plurality of electronic devices commonly referred to as a "universal remote control." Most universal remote controls have "selector buttons" that are associated with the specific electronic device to be controlled by the remote control (i.e. television, VCR, DVD player, etc.).

A few universal remote controls allow for "macros" to be programmed into the remote control so that when a preprogrammed button is depressed a string of commands is executed as programmed. For example, if the user desires to operate their television along with the stereo receiving input from the television, the user would program a macro for turning on the television, turning on the stereo and then switching the input to the stereo for receiving audio input from the television. The main problem with conventional universal remote controls is that they are unable to detect or monitor the state of a particular electronic device. Another problem with conventional universal remote controls is that when a preprogrammed macro is executed, an undesirable effect can occur wherein electronic devices that are desired to be turned on are actually turned off. For example, if the television is already on but the stereo is tuned to a local radio station and the user selects the above macro the power to the television would actually be turned off instead of maintained on.

Recently, universal remote controls have been developed that communicate via radio frequency (RF) with external sensing devices that are connected to the electronic devices for detecting the current state of the electronic device. Other remote controls are able to receive and display information from the electronic device they control such as displaying the name of a radio station on a display of the remote. These devices are relatively expensive and again difficult to utilize for the average consumer.

The main problem with conventional remote control devices is that they are typically unable to know the particular "state" of an electronic device they are to control, particularly universal remote controls. A further problem with conventional remote controls that do allow for advanced configuration thereof to compensate for the various states of the electronic device is that they are often times difficult for the average consumer to utilize. Another problem with conventional remote control devices is that they force consumers to view their electronic devices "individually" (i.e. turn television on, turn stereo on, switch audio input on stereo to television) rather than in broad "tasks" (e.g. watch television).

While these devices may be suitable for the particular purpose to which they address, they are not as suitable for providing efficient and simple operation of a plurality of electronic devices as a coordinated system based upon an overall task. Conventional remote controls are typically programmed to operate only one electronic device. Conventional universal remote controls are typically programmed to operate electronic devices "individually" or are difficult to configure to automated control of a plurality of electronic devices.

In these respects, the state-based remote control system according to the present invention substantially departs from the conventional concepts and designs of the prior art, and in so doing provides an apparatus primarily developed for the purpose of providing efficient and simple operation of a plurality of electronic devices as a coordinated system based upon an overall task.

SUMMARY OF THE INVENTION

In view of the foregoing disadvantages inherent in the known types of remote controls now present in the prior art, the present invention provides a new state-based remote control system construction wherein the same can be utilized for providing efficient and simple operation of a plurality of electronic devices as a coordinated system based upon an overall task.

The general purpose of the present invention, which will be described subsequently in greater detail, is to provide a new state-based remote control system that has many of the advantages of the remote controls mentioned heretofore and many novel features that result in a new state-based remote control system which is not anticipated, rendered obvious, suggested, or even implied by any of the prior art remote controls, either alone or in any combination thereof.

To attain this, the present invention generally comprises a housing, a keypad in communication with an electronic system contained within the housing, and a communication device in communication with the electronic system for communicating with external electronic devices. The electronic system constantly monitors the buttons selected by a user to determine the state of all external electronic devices that are to be controlled. When the user selects a task (e.g. watch television), the electronic system automatically determines the actions required to achieve the desired task based upon the current state of the external electronic devices. After the task has been fulfilled, the electronic system updates the data to reflect the modified state of the external electronic devices.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a state-based remote control system that will overcome the shortcomings of the prior art devices.

A second object is to provide a state-based remote control system for providing efficient and simple operation of a plurality of electronic devices as a coordinated system based upon an overall task.

Another object is to provide a state-based remote control system that provides for intuitive operation of a plurality of electronic devices.

An additional object is to provide a state-based remote control system that allows for the simple operation of a plurality of electronic devices based upon an overall "task" instead of specific controls for specific electronic devices.

A further object is to provide a state-based remote control system that is simple and easy to utilize for the average consumer.

Another object is to provide a state-based remote control system that does not require significant programming prior to usage.

An additional object is to provide a state-based remote control system that is affordable.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
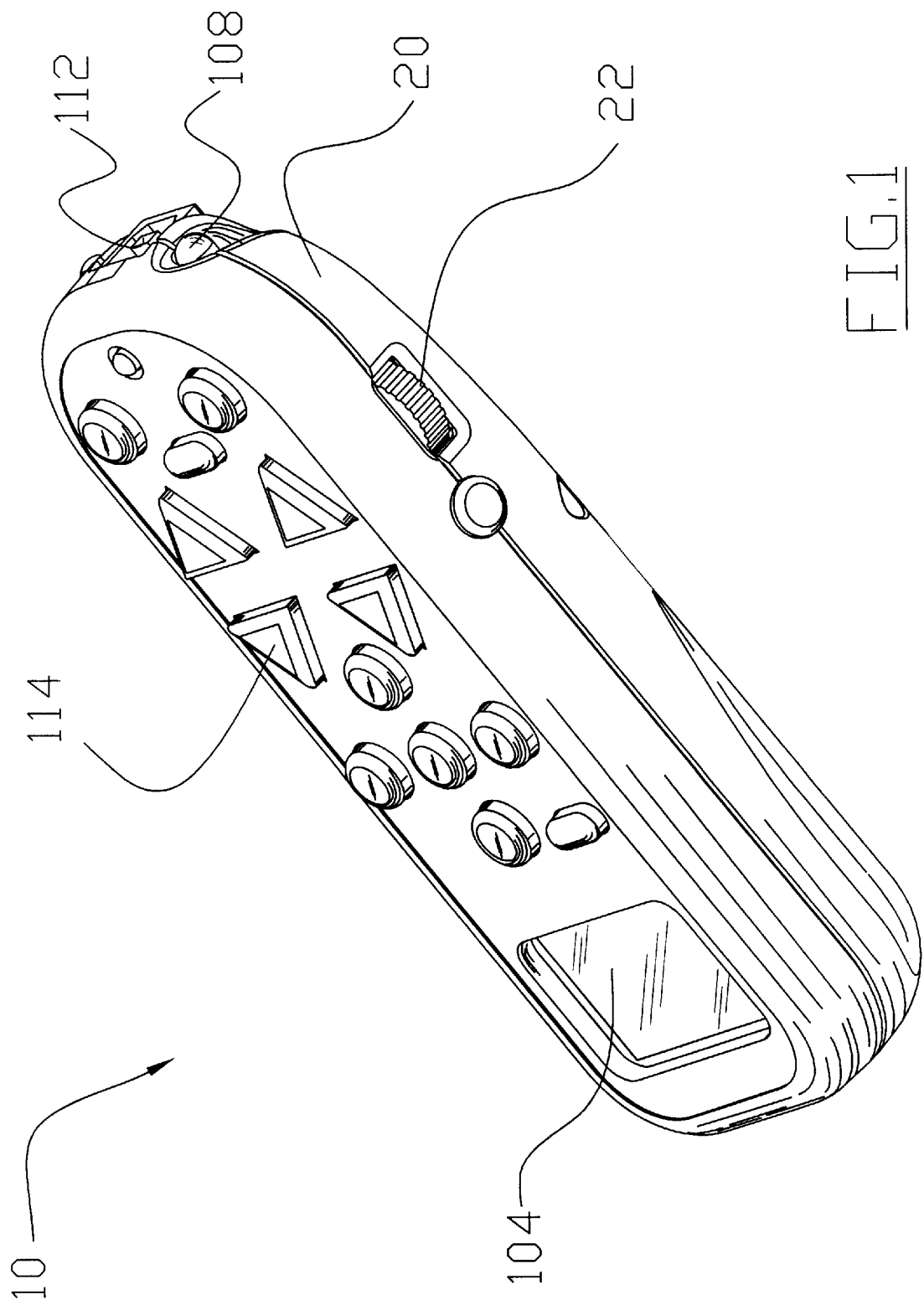
FIG. 1 is an upper perspective view of the present invention.
Figure 2:
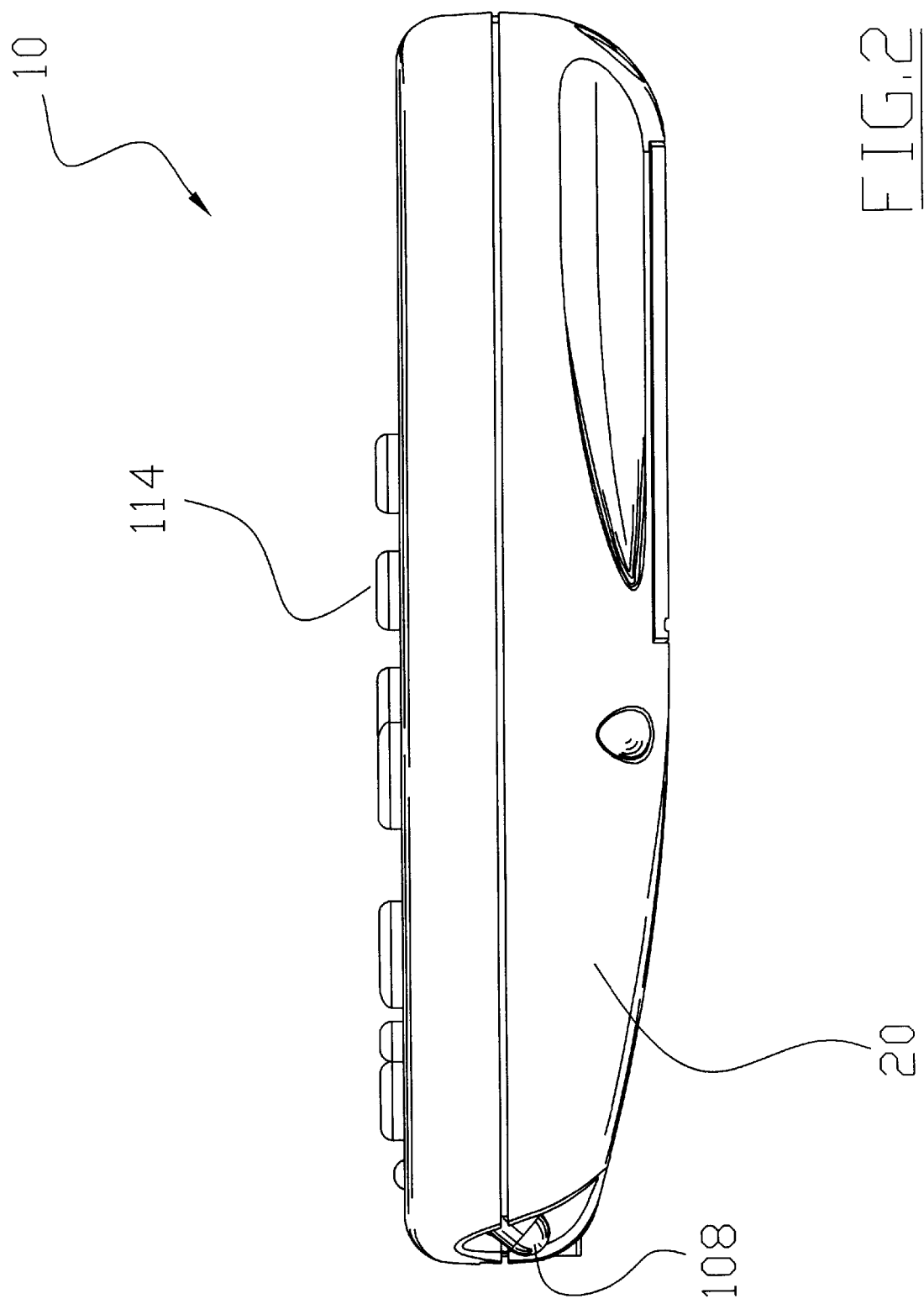
FIG. 2 is a side view of the present invention.
Figure 3:
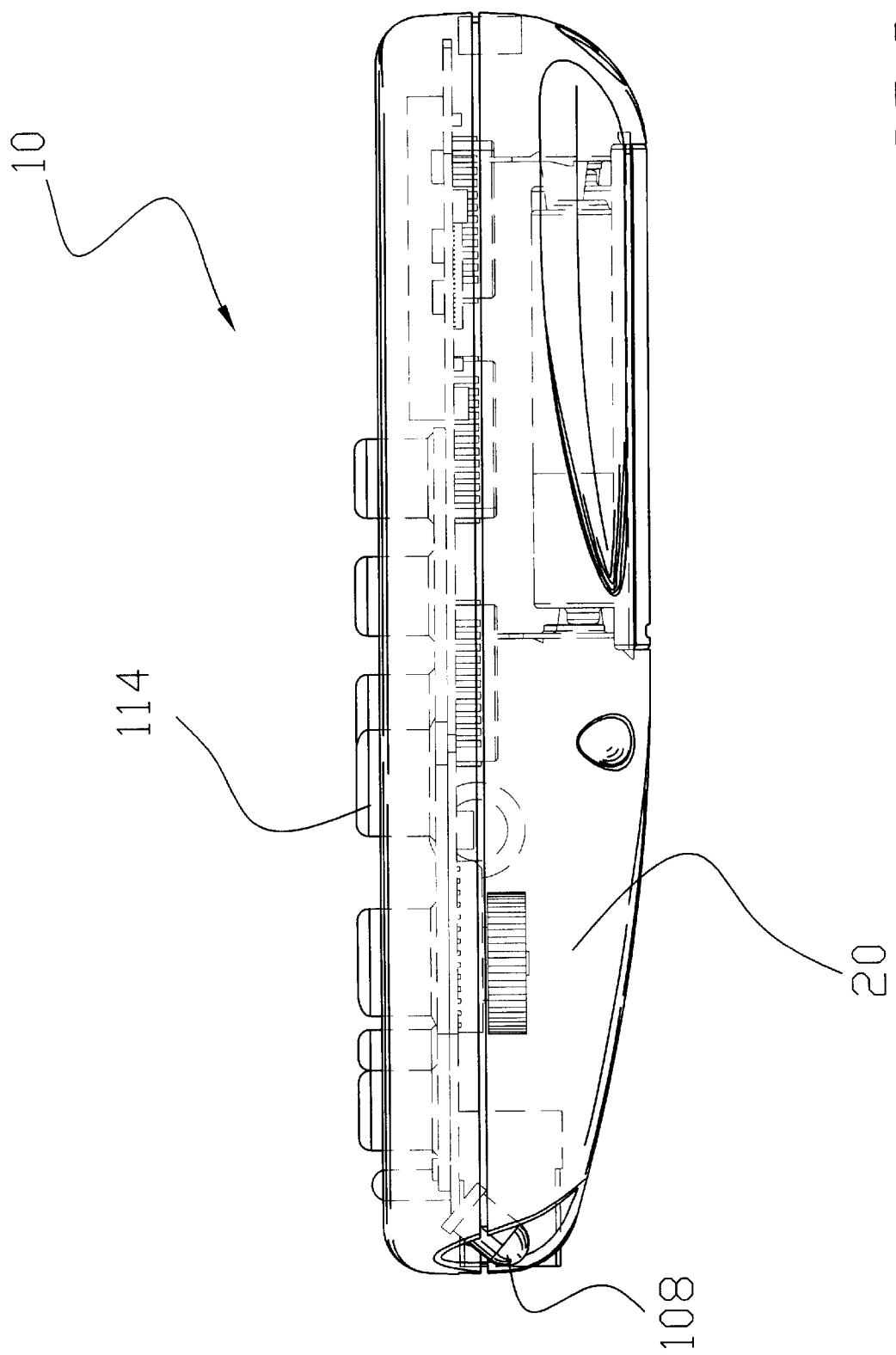
FIG. 3 is a side view of the present invention illustrating electronic circuitry within.
Figure 4:
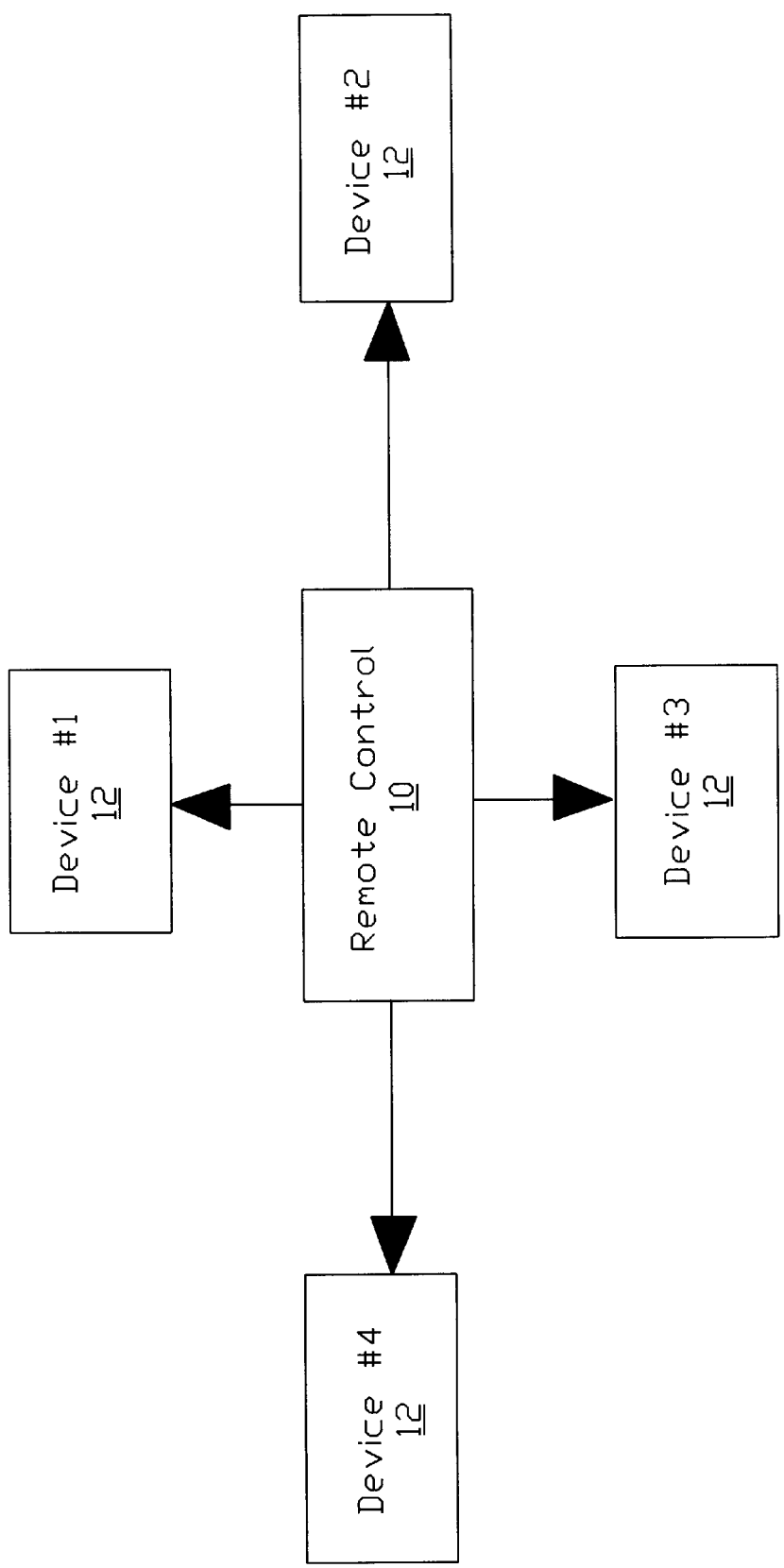
FIG. 4 is a block diagram illustrating the communications between the present invention and a plurality of external electronic devices.
Figure 5:
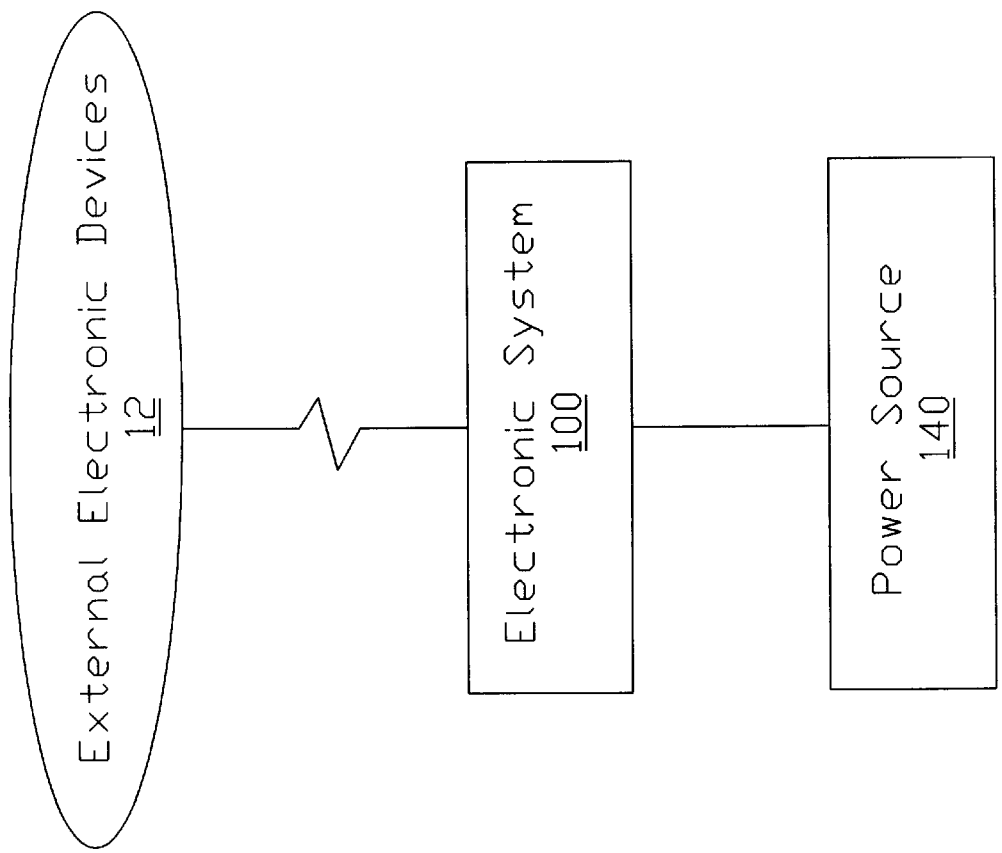
FIG. 5 is a block diagram illustrating the electronic system of the present invention electrically connected to the power source and in communication with the external electronic devices.

Turning now descriptively to the drawings, in which similar reference characters denote similar elements throughout the several views, FIGS. 1 through 11 illustrate a state-based remote control system 10, which comprises a housing 20, a keypad 114 in communication with an electronic system 100 contained within the housing 20, and a communication device 108 in communication with the electronic system 100 for communicating with external electronic devices 12. The electronic system 100 constantly monitors the buttons of the keypad 114 and other switches selected by a user to determine the state of all external electronic devices 12 that are to be controlled. When the user selects a task (e.g. watch television), the electronic system 100 automatically determines the actions required to achieve the desired task based upon the current state of the external electronic devices 12. After the task has been fulfilled, the electronic system 100 updates the data to reflect the modified state of the external electronic devices 12.

A. Housing Structure

The present invention generally is comprised of a housing 20 having a structure and shape similar to conventional remote control devices. The housing 20 may be constructed of various types of materials and shapes as can be appreciated by one skilled in the art. The housing is preferably structured to be ergonomic for a majority of users.

B. Electronic System

The present invention is utilized to control and operate various external electronic devices including but not limited to televisions, stereos, receivers, VCRs, DVD players, CD players, amplifiers, equalizers, tape players, cable units, satellite dish receivers, lighting, window shades and other electronic devices. Almost any number of external electronic devices may be controlled by the present invention as will be discussed in further detail.

Figure 6:
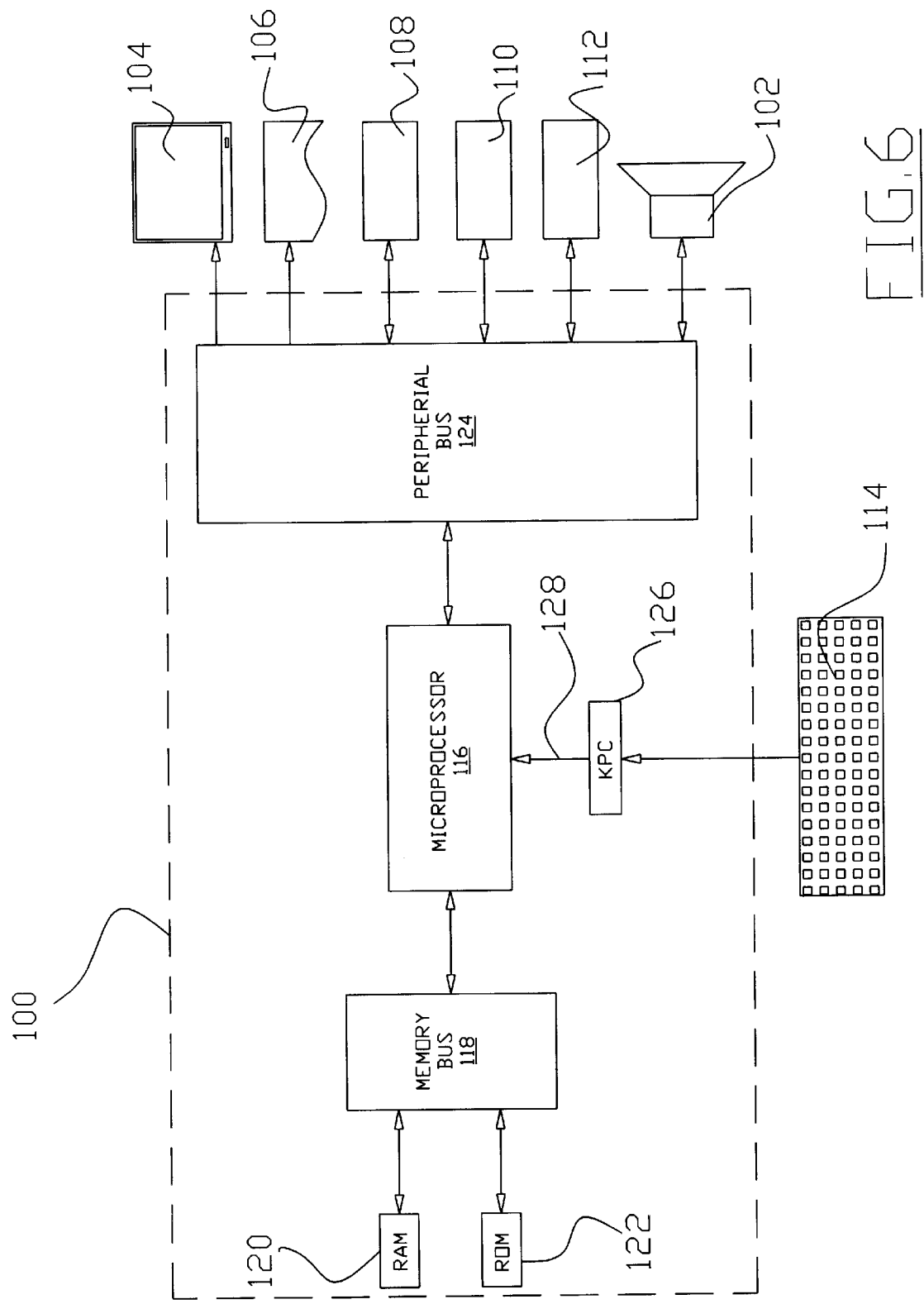
FIG. 6 is a block diagram illustrating the electronic system along with a plurality of accessory devices connected to thereof.

FIG. 6 is a block diagram of an exemplary electronic system 100 for practicing the various aspects of the present invention. The electronic system 100 is preferably enclosed within the housing. A portable power source 140 is electrically connected to the electronic system 100 for providing electrical power to the electronic system 100. The power source 140 may be comprised of any power source such as a battery structure (disposable or rechargeable), solar cells, or direct power.

The electronic system 100 preferably includes a display screen 104, a network interface 112, a keypad 114, a microprocessor 116, a memory bus 118, random access memory (RAM) 120, a speaker 102, read only memory (ROM) 122, a peripheral bus 124, a keypad controller 126, and a communications device 108. As can be appreciated, the electronic system 100 of the present invention may be comprised of any combination of well-known computer devices, personal digital assistants (PDAs), laptop computers, remote control devices and other similar electronic structures.

The microprocessor 116 is a general-purpose digital processor that controls the operation of the electronic system 100. The microprocessor 116 can be a single-chip processor or implemented with multiple components. Using instructions retrieved from memory, the microprocessor 116 controls the reception and manipulations of input data and the output and display of data on output devices.

The memory bus 118 is utilized by the microprocessor 116 to access RAM 120 and ROM 122. RAM 120 is used by microprocessor 116 as a general storage area and as scratchpad memory, and can also be used to store input data and processed data. ROM 122 can be used to store instructions or program code followed by microprocessor 116 as well as other data.

Peripheral bus 124 is used to access the input, output and storage devices used by the electronic system 100. In the described embodiment(s), these devices include a display screen 104, an accessory device 106, a speaker 102, a communications device 108, and a network interface 112. A keypad controller 126 is used to receive input from the keypad 114 and send decoded symbols for each pressed key to microprocessor 116 over bus 128.

The display screen 104 is an output device that displays images of data provided by the microprocessor 116 via the peripheral bus 124 or provided by other components in the electronic system 100. Other output devices such as a printer, plotter, typesetter, etc. can be utilized as an accessory device 106.

The microprocessor 116 together with an operating system operate to execute computer code and produce and use data. The computer code and data may reside on RAM 120, ROM 122, or other storage mediums. The computer code and data could also reside on a removable program medium and loaded or installed onto the electronic system 100 when needed. Removable program mediums include, for example, PC-CARD, flash memory, and floppy disk.

The network interface 112 is utilized to send and receive data over a network connected to other electronic systems. The network interface may be comprised of a Universal Serial Bus (USB), an external bus standard that supports data transfer rates of 12 Mbps (12 million bits per second). A single USB port can be used to connect up to 127 peripheral devices, such as mice, modems, and keyboards. An interface card or similar device and appropriate software implemented by microprocessor 116 can be utilized to connect the electronic system 100 to an existing network and transfer data according to standard protocols including data over a global computer network such as the Internet.

The keypad 114 is used by a user to input commands and other instructions to the electronic system 100. Other types of user input devices can also be used in conjunction with the present invention. For example, pointing devices such as a computer mouse, a jog switch 22, a track ball, a stylus, or a tablet to manipulate a pointer on a screen of the electronic system 100.

The present invention can also be embodied as computer readable code on a computer readable medium. The computer readable medium is any data storage device that can store data which can be thereafter be read by a electronic system. Examples of the computer readable medium include read-only memory, random-access memory, magnetic data storage devices such as diskettes, and optical data storage devices such as CD-ROMs. The computer readable medium can also be distributed over a network coupled electronic systems so that the computer readable code is stored and executed in a distributed fashion.

The communications device 108 may be comprised of any well-known communication system that allows communications with external electronic devices. The communications device 108 may provide for various types of communication such as but not limited to via infrared (IR), wireless (e.g. BLUETOOTH), unidirectional, bi-directional, radio frequency (RF), visible light, ultrasonic and various other means for communicating with external electronic devices.

The environmental unit 110 senses environmental information such as lighting, motion, orientation, temperature, audio and other environmental information. The environmental unit 110 communicates the detected environmental information to the microprocessor 116 for consideration in controlling the external electronic devices. The environmental unit 110 includes the appropriate sensors such as light sensors, temperature sensors, sound sensors and other desirable sensors to determine the environment conditions external of the housing.

Input into the electronic system is accomplished mainly through the usage of the keypad 114. The keypad 114 includes a plurality of buttons that allow the user to execute one or more commands. The keypad 114 allows for the control of basic functions such as volume, channel manipulation, mute, and last channel. However, the keypad 114 may also include several buttons that represent a specific task such as watch television, listen to radio and various other tasks. Various other input devices may be utilized to input data into the electronic system such as a jog switch 22 (i.e. dial), motion and orientation detectors, touch sensitive screens and voice recognition. The display 104 provides information to the user such as possible tasks to complete or the current state of the external electronic devices.

C. Initializing/Synchronizing of Electronic System with External Devices

Figure 7:
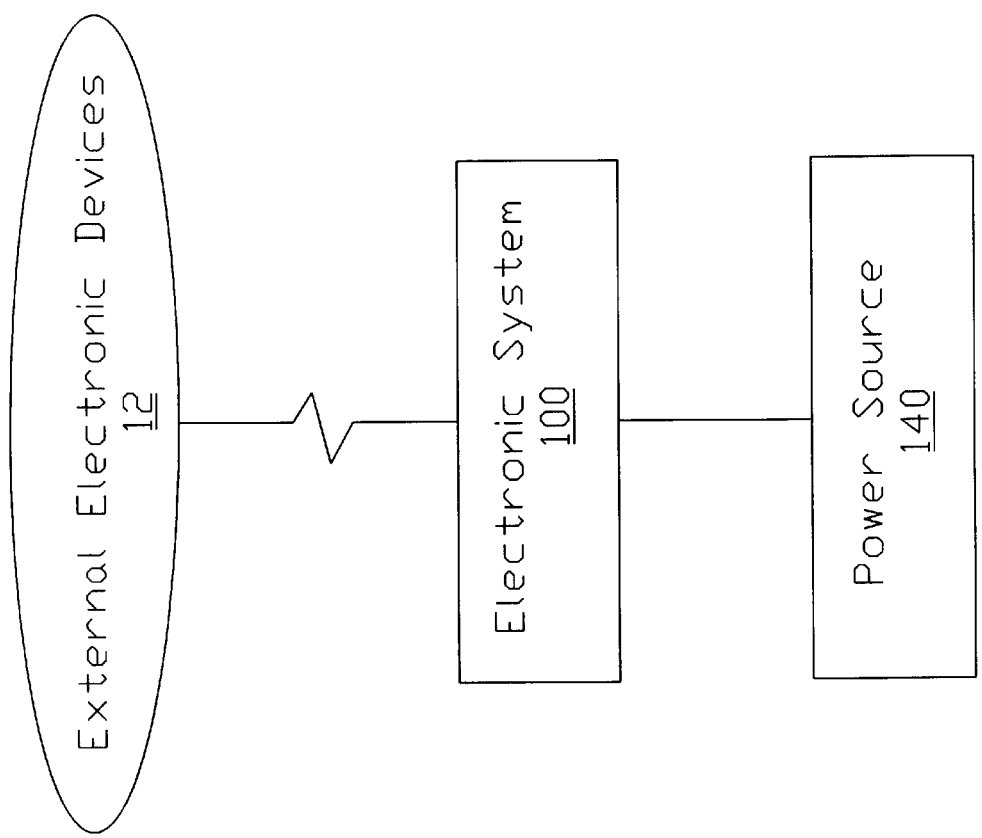
FIG. 7 is a flowchart illustrating the initial programming of the present invention prior to usage.
Figure 8:
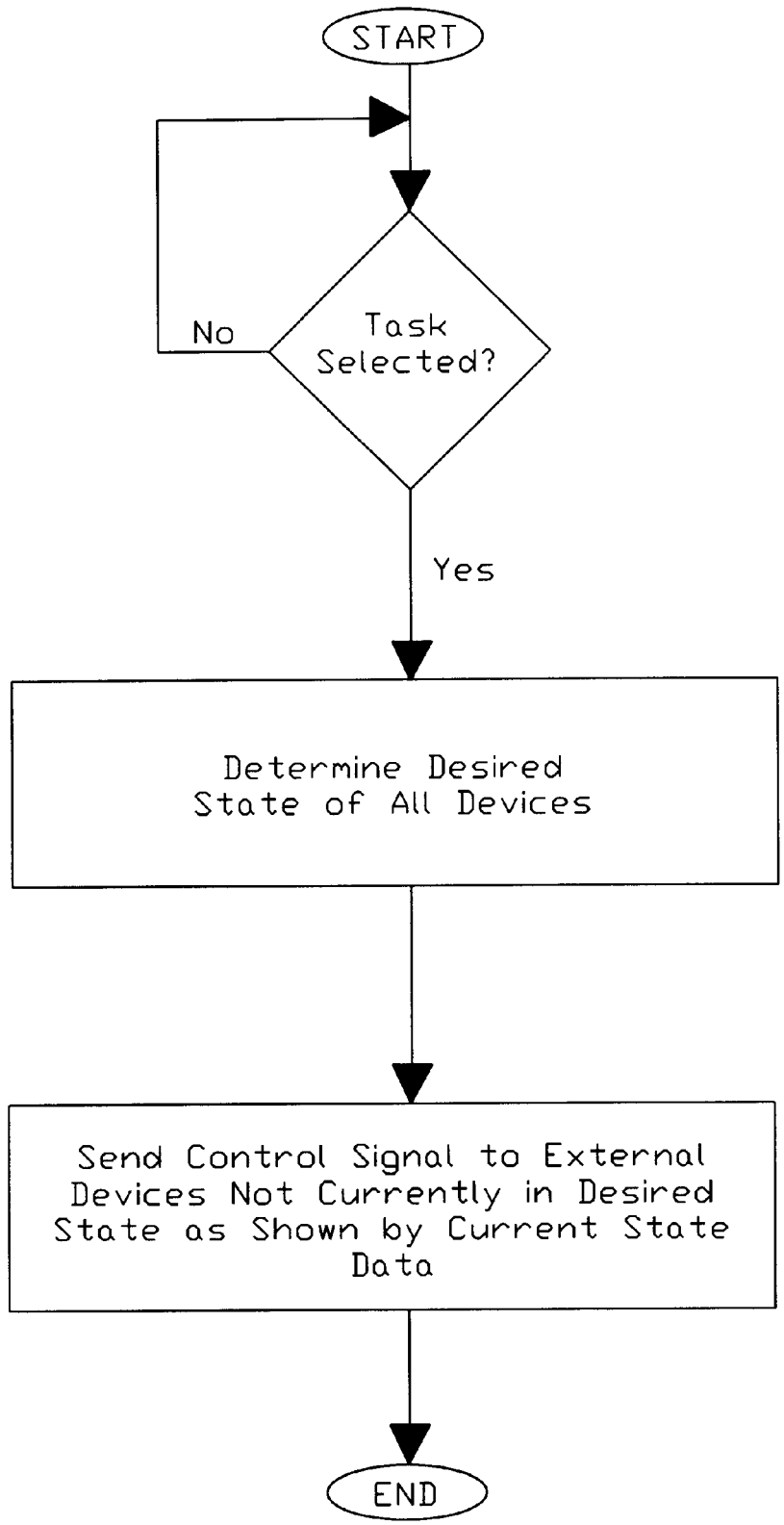
FIG. 8 is a flowchart illustrating the modification of the state of external electronic devices not in the desired state as desired within a task to be performed.

Prior to utilizing the present invention, the user must program the electronic system 100 to not only recognize all of the external electronic devices 12 to be controlled but also as to each external electronic device 12 respective current "states" (i.e. on, off, current input, current output, etc.) as is shown in FIG. 7 of the drawings.

The initial programming of the electronic system 100 may be accomplished through various well-known means such as entering a code for each specific external electronic device. "Sampling" of a signal from a remote control utilized to control a specific electronic device may also be utilized to assist in the programming of the electronic system 100. Various other methods may be utilized to program the electronic system 100 to recognize and control the external electronic devices 12 which are well known in the art.

After all of the external electronic devices 12 have been properly programmed into the electronic system 100, the user then must program the "current state" of each external electronic device into the electronic system 100. This is accomplished typically by the user answering a series of questions shown on the display regarding each display. For example, the display may ask "Is the television turned on?" which the user would respond to. It can be appreciated that there can also be a default state for all of the external devices as being "off." All of the programmed "Current State Data" is stored within memory of the electronic system 100.

D. Current State Data

"Current State Data" is data information relating to the current state of each of the external electronic devices 12 stored within the electronic system 100. The "state" of an external electronic device 12 is comprised of various variables such as but not limited to power on, power off, volume level, mute on, mute off, audio input, audio output, video input, video output, lights on, lights off, shades open, shades closed, and various other states common to external electronic devices 12. The Current State Data is updated as actions and/or tasks are performed to provide an accurate reflection of the actual current state of the external electronic devices 12. The Current State Data is utilized by the electronic system 100 to determine what external electronic devices 12 require modification when a "task" is selected by the user to prevent undesirable events from occurring.

E. Actions

An "action" is a specific event that occurs that typically only affects one of the external devices. An example of an action is when the user selects the power button on the keypad 114 to turn off the television which causes the television to switch from on to off or vice-versa.

Figure 9:
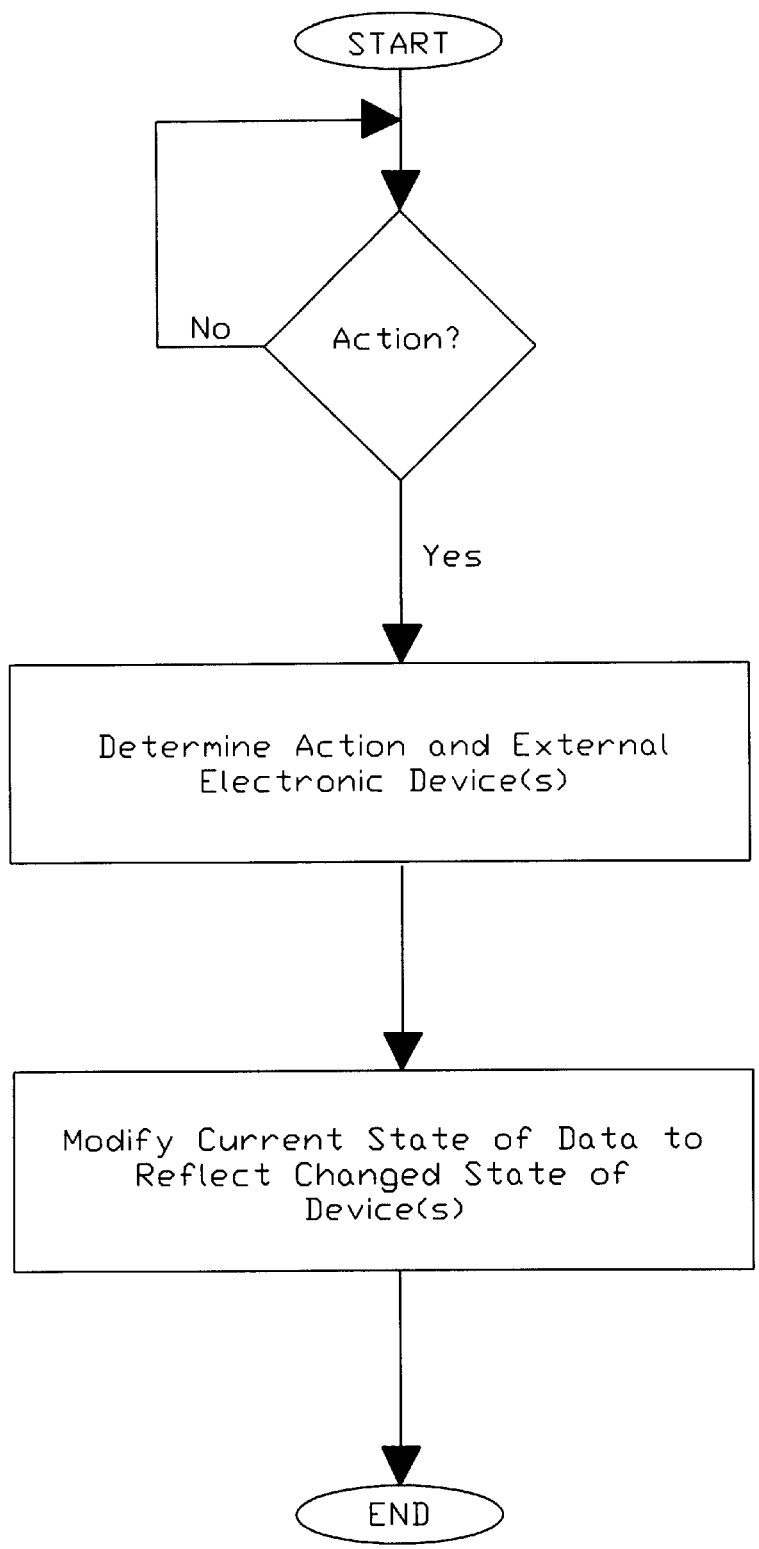
FIG. 9 is a flowchart illustrating an action performed upon one or more external devices and modifying the memory within the electronic system accordingly.
Figure 10:
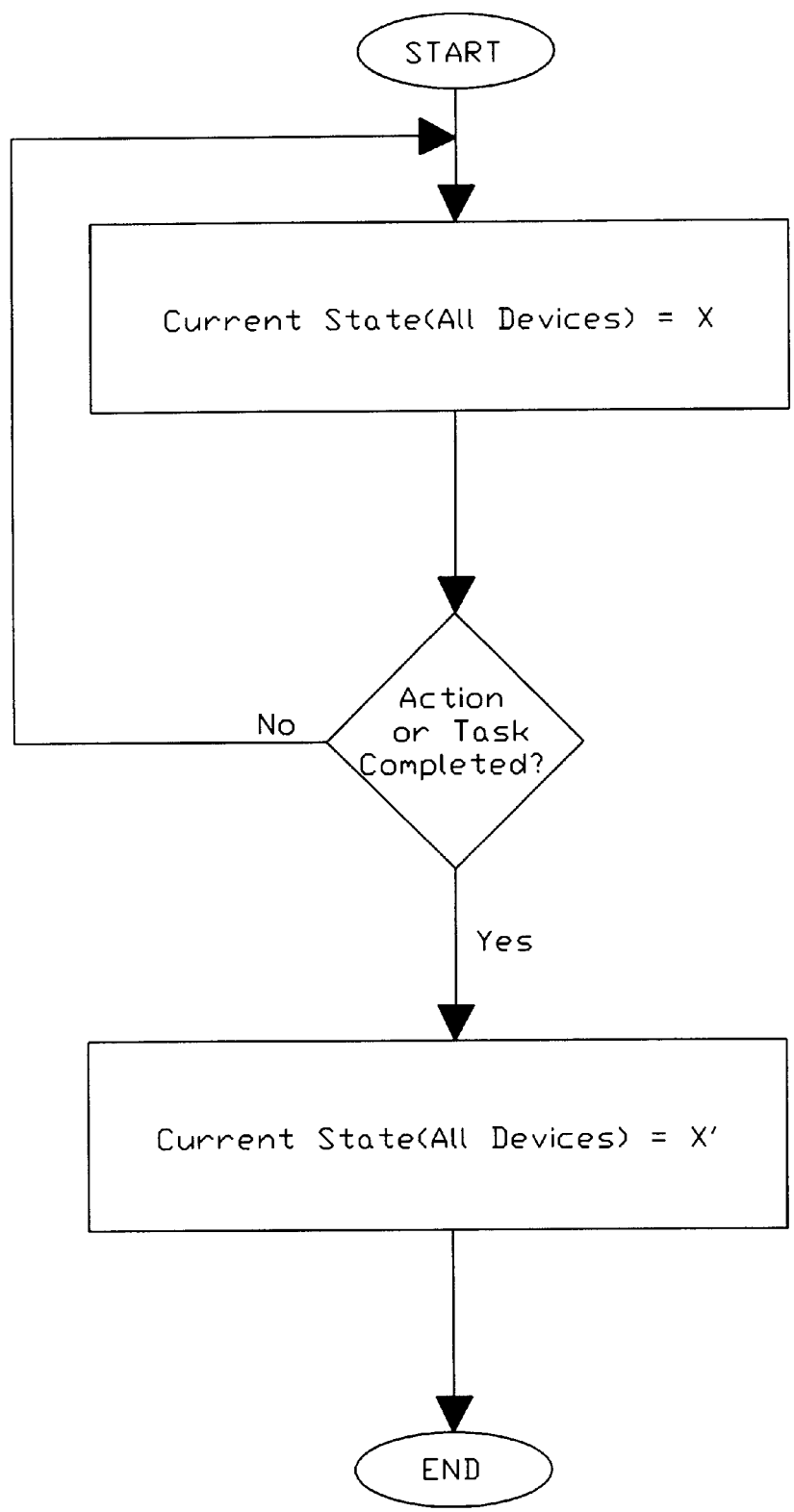
FIG. 10 is a flowchart illustrating the modification of the memory within the electronic system to reflect the changed state of the external electronic devices after a task or an action has been completed.

The Current State Data is immediately modified to reflect the changed state of the television or other external electronic device after an action occurs as shown in FIGS. 9 and 10 of the drawings. The Current State Data is constantly updated to maintain an accurate reflection of the actual current state of the external electronic devices 12.

F. Tasks

A "task" may be comprised of one or more "actions" depending upon (1) the desired state of all external devices as prescribed by the task, and (2) the current state of all external devices. Examples of tasks are "watch television," "listen to radio," "watch video," "listen to CD's," "watch DVD", and so forth. There are many more tasks that may accomplished with the present invention that are not discussed but are deemed readily apparent to one skilled in the art.

Each task has a "desired state" for each of the external electronic devices 12. When a task is selected, either through the keypad or the display, the electronic system 100 immediately determines the Current State Data and compares this data to the "Desired State Data" for all of the external electronic devices 12. After determining which external electronic devices 12 are in the desired state and which are not in the desired state, the electronic system 100 transmits a communication signal to the external electronic devices 12 that are not in the desired state to switch to the desired state based upon the task to be performed.

Another function of the present invention is to allow for the electronic system 100 to determine what menu options (i.e. "tasks") that are available upon the display 104 based upon the current state of the external electronic devices 12. For example, if the television is currently on, the menu within the display may display the "Turn Television Off" task instead of the "Turn Television On" task which is not required.

G. Watch Television Task Example

Figure 11A:
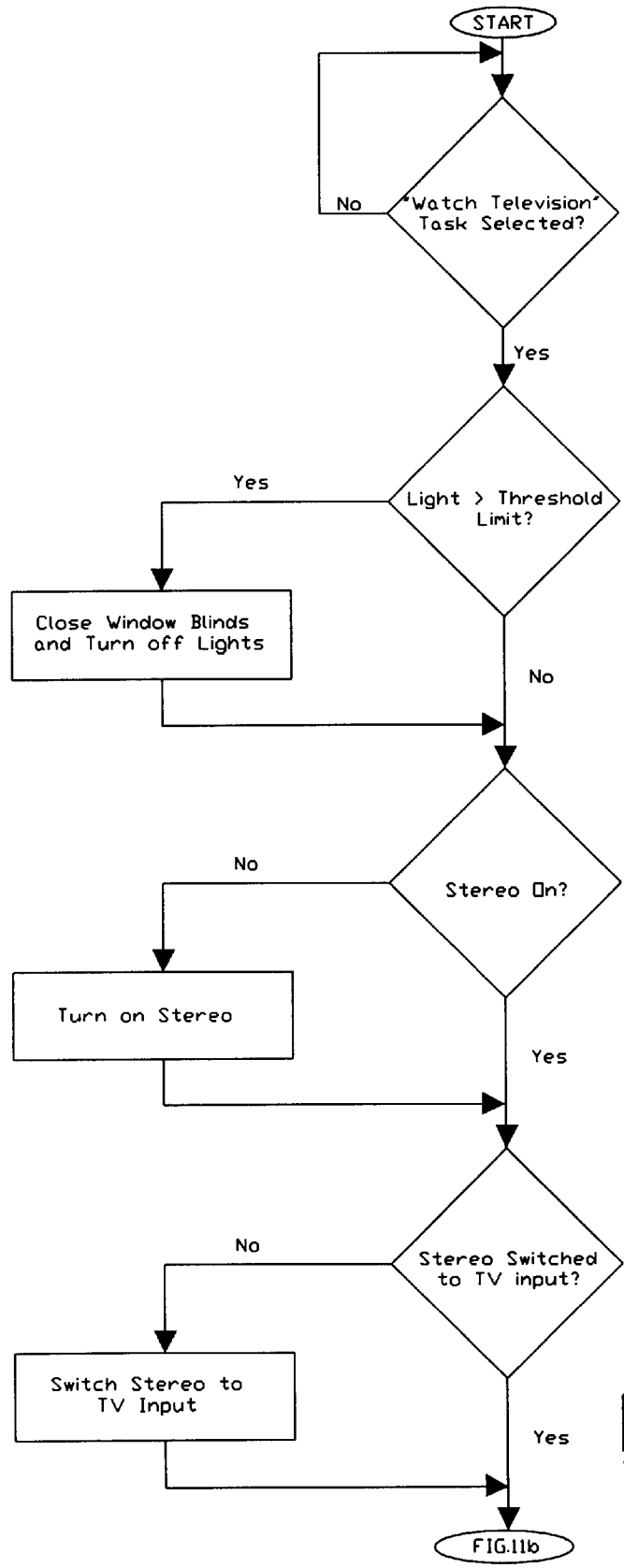
FIGS. 11*a–b* is a flowchart providing an example task for watching television being executed.
Figure 11B:
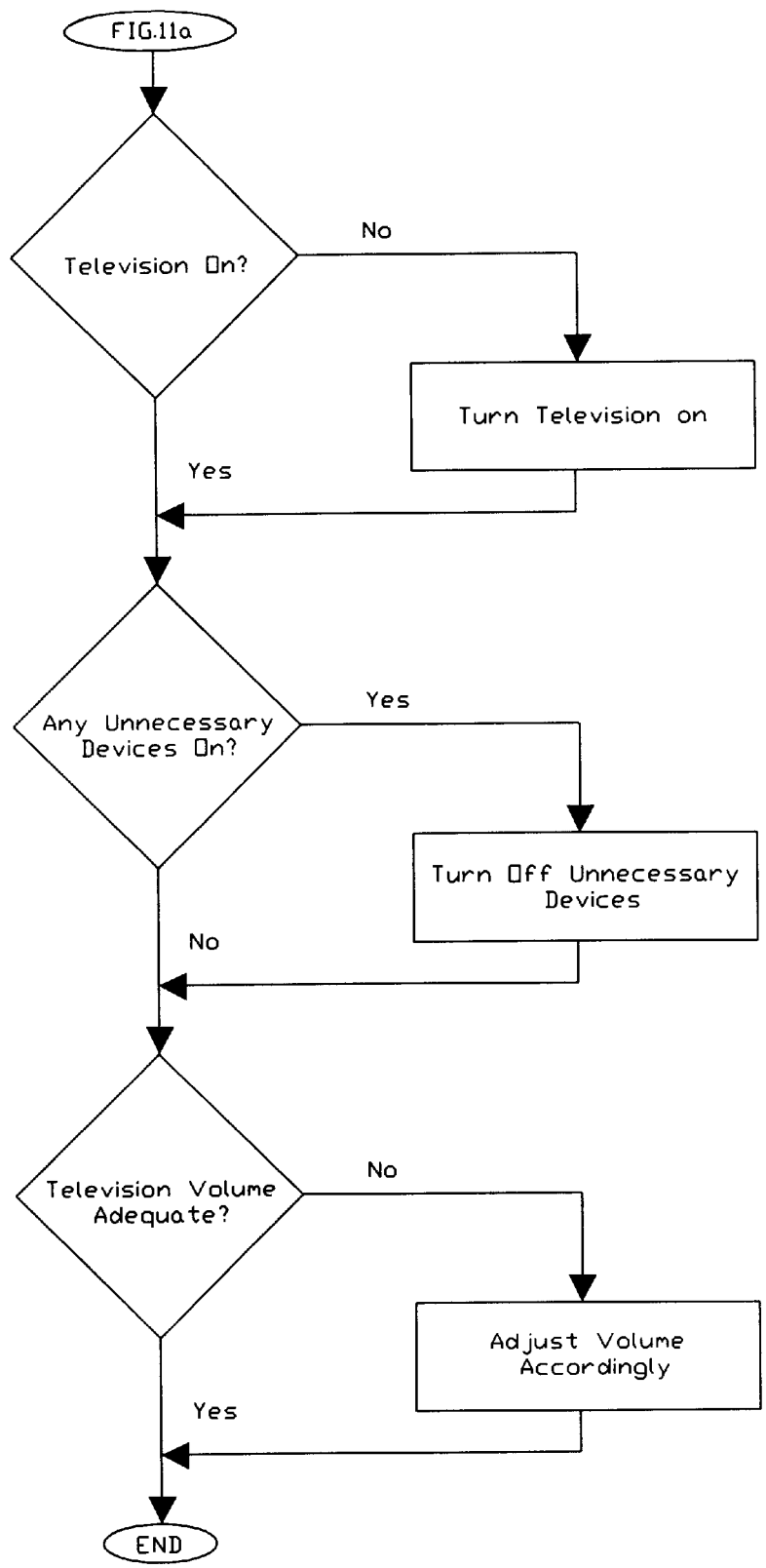

Assuming for the sake of example that a user using the present invention has (1) interior lighting, (2) electronically controlled shades, (3) a stereo, (4) a television, (5) a CD player, and (6) a VCR which are programmed and synchronized within the electronic system as stated above. FIG. 11 illustrates the "WATCH TELEVISION" task. Below is a sample listing of the "Current State Data" prior to the selection of the WATCH TELEVISION task as shown in FIG. 11 of the drawings.

| Current State Data | |
|---|---|
| External Device | Initial State Prior to Execution of Task |
| 1. Room Lighting | Lights turned on and shades open during evening hours. |
| 2. Stereo | Turned on with input audio from CD player. |
| 3. Television | Turned off with volume very high. |
| 4. CD Player | On and playing CD. |
| 5. VCR | Off. |

After selecting the desired WATCH TELEVISION task, the electronic system 100 immediately reads the Current State Data and compares the same to the "Desired State Data." Below is a listing of the Desired State Data for the WATCH TELEVISION task.

| Desired State Data | |
|---|---|
| External Device | Desired State After Execution of Task |
| 1. Room Lighting | Light threshold at a minimum. |
| 2. Stereo | Turned on with input audio from television. |
| 3. Television | Turned on with volume at a low-medium setting. |
| 4. CD Player | Off. |
| 5. VCR | Off. |

After comparing the Current State Data to the Desired State Data, the electronic system 100 determines that the room lighting needs to be reduced by turning off lights and closing shades along with switching the audio input to the television. The electronic system 100 further determines that the television needs to be turned on and the CD player turned off. Below is a listing of the individual actions that the electronic system 100 takes to perform the WATCH TELEVISION task.

| Actions Performed to Reach Desired State | |
|---|---|
| External Device | Action Performed |
| 1. Room Lighting | Turn lighting off and close shades |
| 2. Stereo | Switch input audio to television. |
| 3. Television | Turn on and reduce volume to low-medium setting. |
| 4. CD Player | Turn off. |
| 5. VCR | No action taken. |

After the specific actions are executed to accomplish the overall task, the memory within the electronic system 100 is automatically updated to reflect the various changes to the state of each individual external electronic device 12 for reference later. Below is a listing of the Current State Data after the WATCH TELEVISION task has been performed.

| Current State Data (After Execution of Task) | |
|---|---|
| External Device | Current State After Execution of Task |
| 1. Room Lighting | Light threshold at a minimum. |
| 2. Stereo | Turned on with input audio from television. |
| 3. Television | Turned on with volume at a low-medium setting. |
| 4. CD Player | Off. |
| 5. VCR | Off. |

The above process is repeated for the life of the state-based remote control system 10. If additional external electronic devices are added to the overall entertainment system of the user, the user simply programs the added device 12 into the electronic system 100 and synchronizes the electronic system 100 accordingly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A state-based remote control system, comprising:
   an electronic system capable of storing, calculating and updating a simulated current state data relating to at least one external electronic device;
   a communication device connected to said electronic system for emitting a control signal to said at least one external electronic device; and
   an input unit connected to said electronic system for communicating with said electronic system;
   wherein said simulated current state data is calculated based upon at least one action performed by said electronic system in controlling said at least one electronic device.

2. The state-based remote control system of claim 1, wherein said input unit includes a keypad having a plurality of buttons.

3. The state-based remote control system of claim 2, wherein said input unit includes a display.

4. The state-based remote control system of claim 1, wherein said electronic system is capable of performing tasks based upon a desired state data as compared to said simulated current state data.

5. The state-based remote control system of claim 1, wherein said electronic system only modifies a state of an electronic device that has a simulated current state that does not match a desired state.

6. The state-based remote control system of claim 1, wherein said communication device is able to transmit and receive data.

7. The state-based remote control system of claim 1, wherein said electronic system is programmable to allow for the control of a plurality of external electronic devices.

8. A method of operating a state-based remote control system having an electronic system with a communication device and an input device for controlling at least one external electronic device, said method comprising the steps of:
   (a) determining a simulated current state data of said at least one external electronic device;
   (b) receiving an action request from said input device with respect to said at least one external electronic device;
   (c) performing said action request by communicating to said at least one external electronic device; and
   (d) modifying said simulated current state data to reflect a new state of said at least one external electronic device based upon said action request.

9. The method of operating a state-based remote control system of claim 8, wherein said step (a) comprises asking a series of questions of a user regarding the current state of each of said external electronic devices.

10. The method of operating a state-based remote control system of claim 8, wherein said step (a) comprises assuming all of said external electronic devices are in a predetermined current state.

11. A method of operating a state-based remote control system having an electronic system with a communication device and an input device for controlling a at least one external electronic device, said method comprising the steps of:
   (a) determining a simulated current state data of said at least one external electronic device;
   (b) receiving a task request from said input device with respect to said at least one external electronic device, wherein said task request has a desired state data stored within said electronic system;
   (c) determining which of said external electronic devices require a modification to their respective state in order to achieve said desired state data; and
   (d) modifying at least one selected external electronic device to conform to said desired state data.

12. The method of operating a state-based remote control system of claim 11, including the following step:
   (e) updating said simulated current state data to reflect a new state of said at least one selected external electronic device.

13. The method of operating a state-based remote control system of claim 11, wherein said step (a) comprises asking a series of questions of a user regarding an actual current state of each of said at least one external electronic device.

14. The method of operating a state-based remote control system of claim 11, wherein said step (a) comprises assuming said at least one external electronic device is in a predetermined current state.

15. The method of operating a state-based remote control system of claim 11, wherein said step (c) comprises comparing said simulated current state data with said desired state data.

16. The method of operating a state-based remote control system of claim 11, including the step of:
   (e) displaying a menu containing at least one task that are dependent upon a state of said at least one external electronic device.

17. A remote control apparatus, comprising:

a means for storing, calculating and updating a simulated current state data relating to at least one external electronic device, wherein said simulated current state data is calculated based upon at least one action performed in controlling said at least one electronic device;

a communication device in communication with said means, wherein said communication device is capable of emitting at least one control signal to said at least one external electronic device; and an input device in communication with said means.

18. The remote control apparatus of claim 17, wherein said means is capable of performing tasks based upon a desired state data as compared to said simulated current state data.

19. The remote control system of claim 17, wherein said means only modifies a state of one or more electronic devices that has a simulated current state that does not match a desired state.

20. A remote control apparatus, comprising:

an electronic circuit for storing, calculating and updating a simulated current state data relating to at least one external electronic device, wherein said simulated current state data is calculated based upon at least one action performed in controlling said at least one electronic device;

a communication device in communication with said electronic circuit, wherein said communication device is capable of emitting at least one control signal to said at least one external electronic device; and an input device in communication with said electronic circuit.

21. The remote control apparatus of claim 20, wherein said electronic circuit is capable of performing tasks based upon a desired state data as compared to said simulated current state data.

22. The remote control system of claim 20, wherein said electronic circuit only modifies a state of one or more electronic devices that has a simulated current state that does not match a desired state.

23. A method of operating a remote control for controlling at least one electronic device, said method comprising the steps of:

determining a simulated current state data of said at least one electronic device;

receiving an action request from said input device with respect to said at least one electronic device;

performing said action request by communicating to said at least one external electronic device; and modifying said simulated current state data to reflect a new state of said at least one external electronic device based upon said action request.

24. The method of operating a remote control system of claim 23, wherein said step of determining a simulated current state data comprises asking a series of questions of a user regarding the current state of said at least one electronic device.

25. The method of operating a remote control system of claim 23, wherein said step of determining a simulated current state data comprises assuming said at least one electronic device is in a predetermined current state.

26. A method of operating a remote control system for controlling at least one electronic device, said method comprising the steps of:

determining a simulated current state data of said at least one electronic device;

receiving a task request for said at least one electronic device, wherein said task request has a desired state data;

determining if said at least one electronic device requires a modification to its respective state in order to achieve said desired state data; and modifying a selected electronic device to conform to said desired state data if a modification of state is required.

27. The method of operating a remote control system of claim 26, including updating said simulated current state data to reflect a new state of said selected electronic device.

28. The method of operating a remote control system of claim 26, wherein said step of determining a simulated current state data comprises asking a series of questions of a user regarding an actual current state of each of said at least one external electronic device.

29. The method of operating a remote control system of claim 26, wherein said step of determining a simulated current state data comprises assuming said at least one external electronic device is in a predetermined initial current state.

30. The method of operating a remote control system of claim 26, wherein said step of determining if said at least one electronic device requires a modification comprises comparing said simulated current state data with said desired state data.

31. The method of operating a remote control system of claim 26, including the step of displaying a menu containing at least one task that is dependent upon a state of said at least one electronic device.

32. A method of operating a remote control system for controlling at least one electronic device, said method comprising the steps of:

determining a simulated current state data of said at least one electronic device;

receiving a task request for said at least one electronic device, wherein said task request has a desired state data;

determining if said at least one electronic device requires a modification to its respective state in order to achieve said desired state data based upon a comparison of said simulated current state data with said desired state data;

modifying a selected electronic device to conform to said desired state data if a modification of state is required; and updating said simulated current state data to reflect a new state of said selected electronic device.

33. The method of operating a remote control system of claim 32, wherein said step of determining a simulated current state data comprises asking a series of questions of a user regarding an actual current state of each of said at least one external electronic device.

34. The method of operating a remote control system of claim 32, wherein said step of determining a simulated current state data comprises assuming said at least one external electronic device is in a predetermined initial current state.

35. The method of operating a remote control system of claim 32, including the step of displaying a menu containing at least one task that is dependent upon a state of said at least one electronic device.

* * * * *

UNITED STATES PATENT AND TRADEMARK OFFICE
CERTIFICATE OF CORRECTION

PATENT NO.      : 6,784,805 B2
APPLICATION NO. : 09/804718
DATED           : August 31, 2004
INVENTOR(S)     : Harris et al.

It is certified that error appears in the above-identified patent and that said Letters Patent is hereby corrected as shown below:

IN THE CLAIMS, should read

-- 1. A state-based remote control, comprising:
a remote control capable of storing, calculating and updating a simulated current state data relating to at least one external electronic device;
a communication device connected to said remote control for emitting a control signal to said at least one external electronic device; and
an input unit connected to said remote control for communicating with said remote control;
wherein said simulated current state data is calculated and updated based upon at least one action performed by said remote control in controlling said at least one electronic device prior to a next action or a next task.

2. The state-based remote control of Claim 1, wherein said input unit includes a keypad having a plurality of buttons.

3. The state-based remote control of Claim 1, wherein said input unit includes a display.

4. The state-based remote control of Claim 1, wherein said remote control is capable of performing tasks based upon a desired state data as compared to said simulated current state data.

5. The state-based remote control of Claim 1, wherein said remote control only modifies a state of an electronic device that has a simulated current state that does not match a desired state.

6. The state-based remote control of Claim 1, wherein said communication device is able to transmit and receive data.

7. The state-based remote control of Claim 1, wherein said remote control is programmable to allow for the control of a plurality of external electronic devices.

8. A method of operating a state-based remote control having an electronic circuit with a communication device and an input device for controlling at least one external electronic device, said method comprising the steps of:
(a) determining a simulated current state data of said at least one external electronic device;
(b) receiving an action request or a task request from said input device with respect to said at least one external electronic device;
(c) performing said action request or said task request by communicating to said at least one external electronic device; and
(d) modifying said simulated current state data to reflect a new state of said at least one external electronic device based upon said action request or said task request prior to a next action request or a task request.

UNITED STATES PATENT AND TRADEMARK OFFICE
CERTIFICATE OF CORRECTION

| | |
|---|---|
| PATENT NO. | : 6,784,805 B2 |
| APPLICATION NO. | : 09/804718 |
| DATED | : August 31, 2004 |
| INVENTOR(S) | : Harris et al. |

It is certified that error appears in the above-identified patent and that said Letters Patent is hereby corrected as shown below:

9. The method of operating a state-based remote control of Claim 8, wherein said step (a) comprises asking a series of questions of a user regarding the current state of each of said at least one external electronic device.

10. The method of operating a state-based remote control of Claim 8, wherein said step (a) comprises assuming said at least one external electronic device is in a predetermined current state.

11. A method of operating a state-based remote control having an electronic circuit with a communication device and an input device for controlling at least one external electronic device, said method comprising the steps of:

(a) determining a simulated current state data of said at least one external electronic device;

(b) receiving a task request from said input device with respect to said at least one external electronic device, wherein said task request has a desired state data stored within said electronic circuit;

(c) determining which of said at least one external electronic device require a modification to their respective state in order to achieve said desired state data;

(d) modifying at least one selected external electronic device to conform to said desired state data; and (e) updating said simulated current state data to reflect a new state of said at least one selected external electronic device prior to a next task or a next action.

12. Canceled

13. The method of operating a state-based remote control of Claim 11, wherein said step (a) comprises asking a series of questions of a user regarding an actual current state of each of said at least one external electronic device.

14. The method of operating a state-based remote control of Claim 11, wherein said step (a) comprises assuming said at least one external electronic device is in a predetermined current state.

15. The method of operating a state-based remote control of Claim 11, wherein said step (c) comprises comparing said simulated current state data with said desired state data.

16. The method of operating a state-based remote control of Claim 11, including the step of: (e) displaying a menu containing at least one task that is dependent upon a state of said at least one external electronic device.

UNITED STATES PATENT AND TRADEMARK OFFICE
CERTIFICATE OF CORRECTION

| | |
|---|---|
| PATENT NO. | : 6,784,805 B2 |
| APPLICATION NO. | : 09/804718 |
| DATED | : August 31, 2004 |
| INVENTOR(S) | : Harris et al. |

It is certified that error appears in the above-identified patent and that said Letters Patent is hereby corrected as shown below:

17. A remote control apparatus, comprising:
a means for storing, calculating and updating a simulated current state data relating to at least one external electronic device, wherein said simulated current state data is calculated and updated based upon at least one action performed in controlling said at least one electronic device prior to a next action or a next task;
a communication device in communication with said means, wherein said communication device is capable of emitting at least one control signal to said at least one external electronic device; and
an input device in communication with said means.

20. A remote control apparatus, comprising:
an electronic circuit for storing, calculating and updating a simulated current state data relating to at least one external electronic device, wherein said simulated current state data is calculated based upon at least one action performed in controlling said at least one electronic device prior to a next action or a next task;
a communication device in communication with said electronic circuit, wherein said communication device is capable of emitting at least one control signal to said at least one external electronic device; and
an input device in communication with said electronic circuit.

21. The remote control apparatus of Claim 20, wherein said electronic circuit is capable of performing tasks based upon a desired state data as compared to said simulated current state data.

22. The remote control apparatus of Claim 20, wherein said electronic circuit only modifies a state of one or more electronic devices that has a simulated current state that does not match a desired state.

23. A method of operating a remote control for controlling at least one electronic device, said method comprising the steps of:
determining a simulated current state data of said at least one electronic device; receiving an action request from said input device with respect to said at least one electronic device;
performing said action request by communicating to said at least one external electronic device; and
modifying said simulated current state data to reflect a new state of said at least one external electronic device based upon said action request prior to a next action request or a next task request.

24. The method of operating a remote control of Claim 23, wherein said step of determining a simulated current state data comprises asking a series of questions of a user regarding the current state of said at least one electronic device.

25. The method of operating a remote control of Claim 23, wherein said step of determining a simulated current state data comprises assuming said at least one electronic device is in a predetermined current state.

UNITED STATES PATENT AND TRADEMARK OFFICE
CERTIFICATE OF CORRECTION

PATENT NO. : 6,784,805 B2
APPLICATION NO. : 09/804718
DATED : August 31, 2004
INVENTOR(S) : Harris et al.

It is certified that error appears in the above-identified patent and that said Letters Patent is hereby corrected as shown below:

26. A method of operating a remote control for controlling at least one electronic device, said method comprising the steps of:
  determining a simulated current state data of said at least one electronic device; receiving a task request for said at least one electronic device, wherein said task request has a desired state data; determining if said at least one electronic device requires a modification to its respective state in order to achieve said desired state data;
  modifying a selected electronic device to conform to said desired state data if a modification of state is required; and
  updating said simulated current state data to reflect a new state of said selected electronic device prior to a next task or a next action.

27. Canceled

28. The method of operating a remote control of Claim 26, wherein said step of determining a simulated current state data comprises asking a series of questions of a user regarding an actual current state of each of said at least one external electronic device.

29. The method of operating a remote control of Claim 26, wherein said step of determining a simulated current state data comprises assuming said at least one external electronic device is in a predetermined initial current state.

30. The method of operating a remote control of Claim 26, wherein said step of determining if said at least one electronic device requires a modification comprises comparing said simulated current state data with said desired state data.

31. The method of operating a remote control of Claim 26, including the step of displaying a menu containing at least one task that is dependent upon a state of said at least one electronic device.

UNITED STATES PATENT AND TRADEMARK OFFICE
CERTIFICATE OF CORRECTION

PATENT NO.         : 6,784,805 B2
APPLICATION NO. : 09/804718
DATED                 : August 31, 2004
INVENTOR(S)       : Harris et al.

It is certified that error appears in the above-identified patent and that said Letters Patent is hereby corrected as shown below:

32. A method of operating a remote control for controlling at least one electronic device, said method comprising the steps of:
    determining a simulated current state data of said at least one electronic device;
    receiving a task request for said at least one electronic device, wherein said task request has a desired state data;
    determining if said at least one electronic device requires a modification to its respective state in order to achieve said desired state data based upon a comparison of said simulated current state data with said desired state data;
    modifying a selected electronic device to conform to said desired state data if a modification of state is required; and
    updating said simulated current state data to reflect a new state of said selected electronic device prior to a next action request or a next task request.

33. The method of operating a remote control of Claim 32, wherein said step of determining a simulated current state data comprises asking a series of questions of a user regarding an actual current state of each of said at least one external electronic device.

34. The method of operating a remote control of Claim 32, wherein said step of determining a simulated current state data comprises assuming said at least one external electronic device is in a predetermined initial current state.

35. The method of operating a remote control of Claim 32, including the step of displaying a menu containing at least one task that is dependent upon a state of said at least one electronic device. --

Signed and Sealed this

Nineteenth Day of September, 2006

JON W. DUDAS
*Director of the United States Patent and Trademark Office*